June 5, 1951 R. L. ALTY 2,555,305

PULSING CIRCUIT

Filed Feb. 4, 1946 3 Sheets-Sheet 1

INVENTOR.
RAYMOND L. ALTY

BY [signature]

ATTORNEY

INVENTOR.
RAYMOND L. ALTY
BY M. O. Hayes
ATTORNEY

June 5, 1951 R. L. ALTY 2,555,305

PULSING CIRCUIT

Filed Feb. 4, 1946 3 Sheets-Sheet 3

INVENTOR.
RAYMOND L. ALTY

BY *M. O. Hayes*

ATTORNEY

Patented June 5, 1951 2,555,305

UNITED STATES PATENT OFFICE 2,555,305

PULSING CIRCUIT

Raymond L. Alty, Alexandria, Va.

Application February 4, 1946, Serial No. 645,420

8 Claims. (Cl. 250—36)

(Granted under the act of March 3, 1883, as amended April 30, 1928; 370 O. G. 757)

This invention relates broadly to pulsing circuits, and more particularly to those circuits designed to produce high voltage levels in pulses of short duration, operating from a direct current potential supply.

For many recent electronic applications it has become necessary to have circuits which can produce very short pulses of high voltage. The requirements on these circuits have become progressively more stringent, in that the pulse durations must be precise, and higher voltage levels attained and held during the pulse. For example, in devices utilizing the radar principle, short pulses of radio frequency energy are produced at spaced time intervals. It is well known that for optimum results, as high power levels as possible in the pulse are desirable, and that for increased accuracy the duration of the pulse should be as precise as possible. Much simplicity of construction is achieved in such devices if the transmitter generating the radio frequency energy is on during the pulse, and off between pulses. Then there must be a pulsing circuit to turn the transmitter on and the same requirements hold for the pulse output of this circuit.

The capabilities and limitations of pulsing circuits devised to the end of satisfying such requirements depend largely on the potential supply available. Independent conditions often necessitate the use of a primary direct current source supplying a potential far below that required to generate the pulses. It is with this situation that the present invention is concerned.

Generally, pulsing circuits for such purposes involve these elements: a direct current potential supply, an energy storage device, a load to be pulsed, and a switch. The requirement of precision of pulse duration is largely met by utilizing as energy storage device an artificial transmission line, or pulse network, made up of many similar storage sections. The pulse is formed by discharging this storage device through the load. Thus the following essential steps take place in such a system:

(*a*) Charging the energy storage device, and (*b*) Discharging the energy storage device through the load.

Operations (*a*) and (*b*) are differentiated by opening and closing the switch. The switch action may be synchronized with trigger pulses from a keyer. Obviously the requirements of precision hinge largely on the accuracy with which the switch opens and closes.

It is an object of the present invention to generate high voltage pulses from a low voltage source.

It is another object of the present invention to provide a system for generating precise high voltage pulses of short duration, operating from a low voltage source.

It is still another object of the present invention to provide a system for generating precise pulses of short duration, the only limitation in the amplitude of the pulses being the unavoidable losses in the system.

That these objects are achieved will be apparent in the light of the following description and figures, of which:

Figure 1:
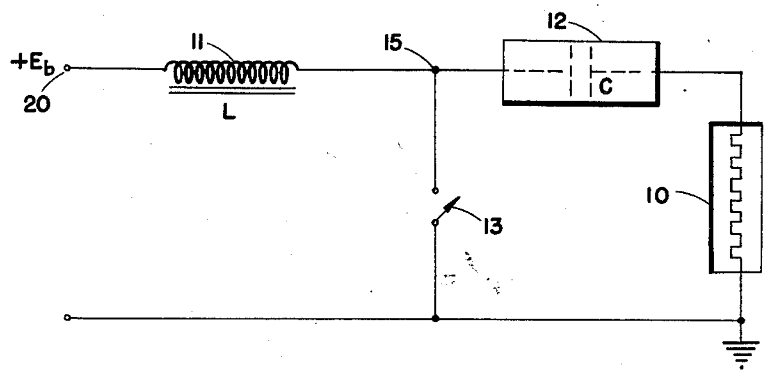
Figure 1 shows a typical circuit devised for these applications.

A typical circuit devised for these applications is shown in Fig. 1. The load 10 may be a transmitter, or some other mainly dissipative impedance. There is a source of positive direct current potential $E_b$ at terminal 20, an inductor 11, and a pulse storage device 12, connected in series with the load 10 to ground. A switch 13 is connected in parallel with the energy storage device 12 and load 10 to ground. The switch 13 is open between pulses, and is closed to allow pulse storage device 12 to discharge through the load 10. Between pulses, when switch 13 is open, the energy storage device may charge to the potential of the source, $E_b$. The inductor 11 is assumed to be large enough to effectively isolate the source of potential supply from the rest of the circuit for events of as short duration as that of a pulse. The switch 13 must be opened very shortly after a pulse, in order to allow the energy storage device to recharge, and in order to prevent drawing excessive currents from the potential supply.

For events of the order of magnitude in time of the interval between pulses, the energy storage device 12 may be regarded as a capacitor, the effect of its inductance being entirely negligible in comparison with that of inductor 11. The symbols C and L will refer to this effective capacity and inductance respectively.

Figure 2:
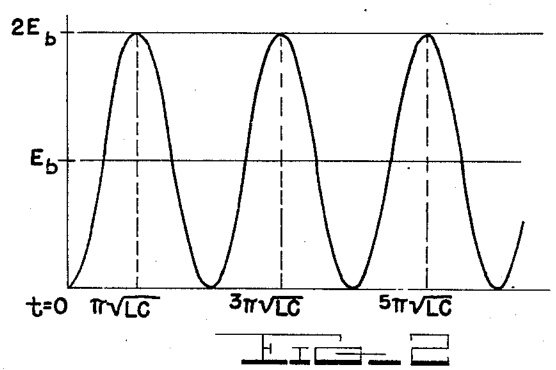
Figure 2 shows a waveform useful in analyzing the operation of the circuit of Figure 1.

To analyze the operation of the circuit of Fig. 1, suppose an initial instant at which switch 13 is opened. The voltage at point 15 will vary with time in the manner shown in Fig. 2. This is the well known damped oscillation of period $2\pi\sqrt{LC}$. The losses in this type of circuit are usually low enough to make their effect negligible for the first cycles of the oscillation. Assuming this, the voltage from point 15 to ground reaches a value nearly equal to $2E_b$ at a point of time $\pi\sqrt{LC}$ seconds after the initial instant.

If the switch 13 is closed when the voltage is at its maximum value, the energy storage device 12 will discharge round the loop thus provided, applying a pulse to the load 10. The circuit should then be at its initial condition when the pulse is over, and S is reopened. It should be noted that what determines the time of opening the switch is that this should take place at a time after closing when the voltage has reached a first minimum. The inductor 11 is assumed so large that there is effectively no change in current through it for the time interval during which the switch 13 is closed. The value of its inductance L has to satisfy other conditions as well, and this requires that the switch 13 not remain closed long enough to make any appreciable change in current through the inductor 11 for the value of L compromised upon.

In repeating the process, it is seen that the time of closing the switch 13 is precisely determined by values of L and the effective capacitor C. Conversely, if this time is set by other considerations, the product LC is fixed in value. Generally, C is itself fixed by considerations of pulse duration. This fixes the value of L. The process of charging under these conditions, when the switch closes at intervals $\pi\sqrt{LC}$ seconds apart, comes under the general designation of resonant charging.

For a precise pulse to appear across the load 10, the impedence of the load must be matched to the characteristic impedance of the energy storage device 12. If this is done, half the voltage to which the storage device 12 is charged appears across the load 10 during the discharge. If the impedances are not matched, reflections exist. This is generally undesirable. For example, in any case in which the load impedance 10 is a transmitter, the pulse must be precise and maintain its voltage level to close tolerances in order to have stabilized operation of the transmitter. With a matched energy storage device made of N similar sections, the pulse duration $\delta$ is given by $\delta=2N\sqrt{L_0C_0}$ where $L_0$ is the inductance, and $C_0$ the capacitance of a section. For a totally dissipative load R, the maximal power that can appear across it is then $E^2_b/R$.

It appears that if higher power is to be made available at the load, some method must be devised to charge the energy storage device to a higher voltage. Achieving this in turn requires a switch which is at once precise in operation and capable of carrying high currents.

Figure 3:
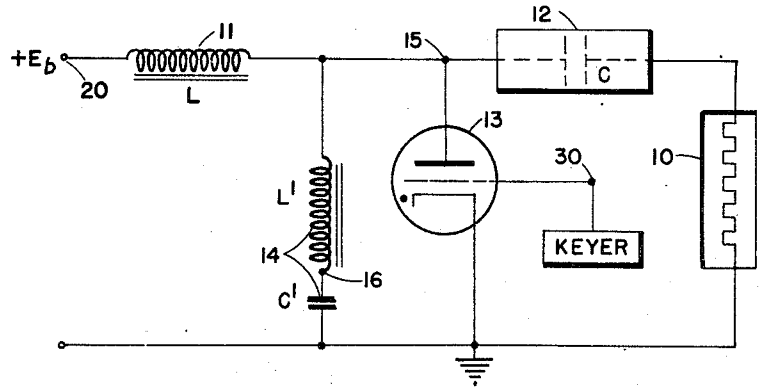
Figure 3 shows a circuit diagram of an embodiment of the present invention.

In Figure 3 is shown a diagram of an embodiment of the present invention, with a source of positive direct current potential $E_b$ at terminal 20, a thyratron switch tube 13, with an input grid terminal 30, an artificial transmission line 12, as an energy storage device of total capacity C, a large inductor 11 with inductance L, a load impedance 10, assumed mainly dissipative, and an additional series resonant circuit 14, of inductance L′ and capacitance C′. The value of inductance L′ has to be large enough to effectively isolate the resonant circuit 14 from the rest of the circuits for events as short as a single pulse.

The value L of inductor 11 is so chosen that $$T=\pi\sqrt{L(C+C')}$$

where T is the interval between trigger pulses arriving at input terminal 30.

Figures 4, 5, 6, 7:
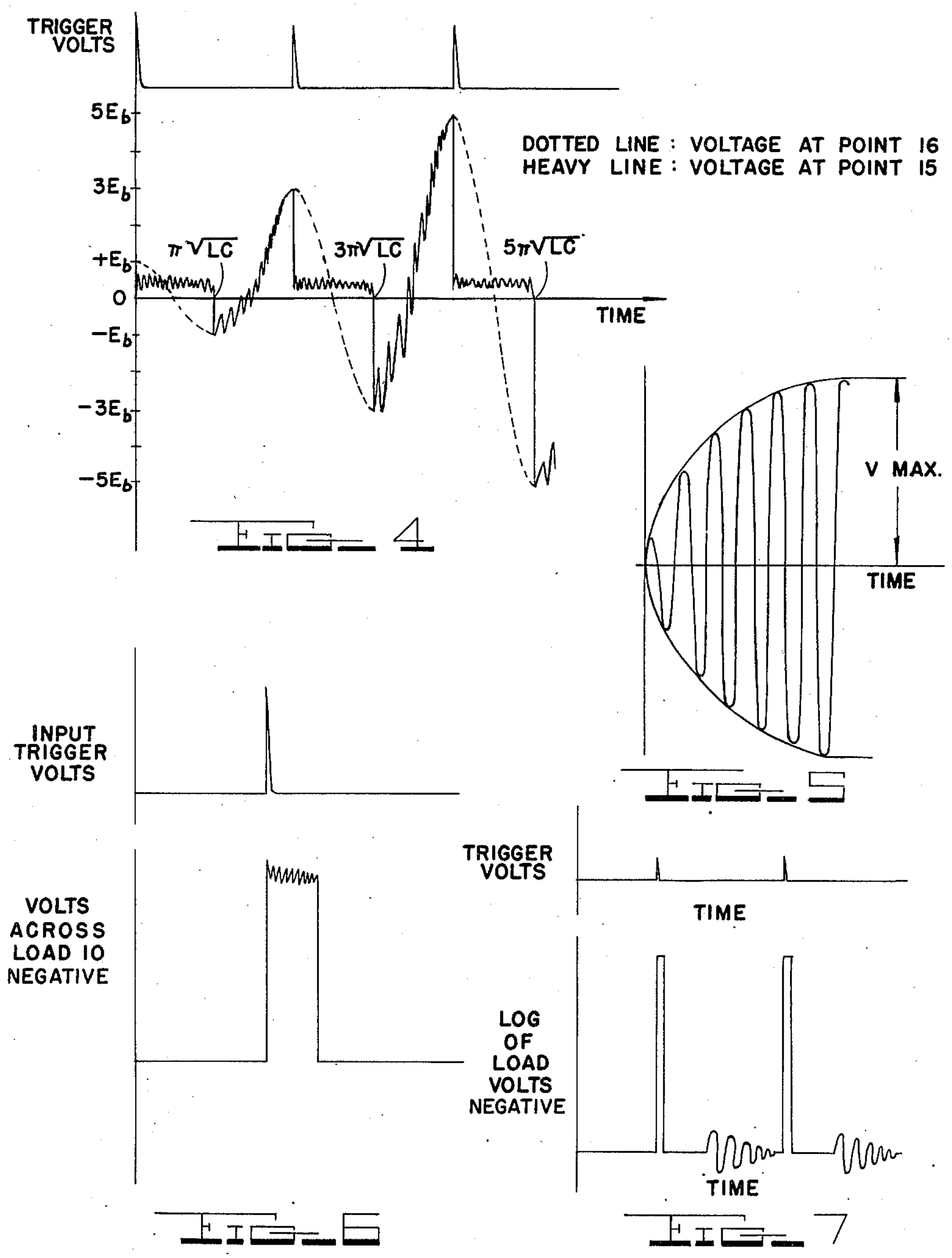
Figure 4 shows waveforms useful in analyzing the operation of the circuit of Figure 3.
Figure 5 shows another waveform useful in analyzing the same circuit.
Figure 6 shows a waveform of the output voltage of the circuit of Fig. 3.
Figure 7 shows the same waveform, to an expanded scale.

Fig. 4 shows in dotted line the variations in voltage at point 16, effectively that across capacitor C′. In heavy line is shown the variations in voltage at point 15, at the plate of thyratron switch tube 13. To the scale used in this figure, the pulse duration $\delta$ should be so small as to be invisible.

To follow the operation, suppose that initially the thyratron 13 is effectively an open switch, and the circuit is charged to the supply potential $E_b$. This is the situation at time zero on Fig. 4, when a trigger pulse is applied to input terminal 30 of switch tube 13. The thyratron switch 13 will then close providing a very low impedance path to ground for current from the storage device 12. The voltage across the load 10 falls to $E_b/2$ for the duration of the pulse $\delta$, and then to practically zero, if the load is matched to the storage device impedance.

The voltage at point 16, or across C′, will commence oscillatory behavior, and if left alone would decay in the manner characteristic to this type of resonant circuit. The losses are assumed small, so that for the first few cycles of oscillation they may be neglected. At the extreme negative swing of the oscillation the current in the resonant circuit 14 is zero. It would proceed to reverse direction through switch thyratron 13 but for the fact that the thyratron 13, having but one emissive element, will not permit a sufficient reverse flow of current. It should be noted that the thyratron will not have extinguished altogether at this point. At this instant, since current in L′ is zero, the potential at the plate of switch tube 13 then becomes the same as that across C′, that is, it falls almost instantaneously to a value of nearly $-E_b$ as the thyratron extinguishes completely. The charging process for C′ and the energy storage device 12 then recommences at once. Because of the fact that two oscillatory circuits are exchanging a certain amount of current in this charging process, superposed on the charging curve of period $$2\pi\sqrt{L(C+C')}$$

is an oscillation, as shown in solid line. Neglecting this oscillation, which does not affect the essential operation, the voltage V at the plate of thyratron 13, point 15, will rise during the charging process, as in the circuit of Fig. 2, to a value as far above $E_b$ as its initial value was below $E_b$. This is due to the well known action of L in the charging circuit, and will raise $V_{15}$ to $$E_b+[E_b-(-E_b)]$$

The maximum value of V is then $V_{max}=3E_b$. When the voltage across C′ reaches nearly this value $V_{max}$, the thyratron switch is fired again. The voltage at point 15 goes nearly to zero, and the resonant circuit 14 oscillates, with an initial condition of voltage $3E_b$ across C′. When the next extreme negative voltage swing occurs, the potential at the plate of the switch thyratron 13 falls to nearly $-3E_b$, and charging of C begins as before, with a new $V_{max}$, $$V_{max}=E_b+[E_b-(-3E_b)]=5E_b$$

When the plate of thyratron 13 reaches this voltage, retriggering takes place, and the cycle recommences.

Owing to the losses in the circuit, the $V_{max}$ value will soon stabilize with the circuit operating in a steady state, as shown in Fig. 5. This value of $V_{max}$ is limited and determined only by the losses in the circuit. It is seen from this that the value of $V_{max}$ will vary from circuit to circuit, and that some adjustment may be necessary in order to fix this value to some desired figure. The losses in such circuits are normally quite low. For a dissipative load R, the power output is then $V^2_{max}/2R$.

In Fig. 6 is shown the voltage pulse, and in Fig. 7 to an expanded time scale the pulse and the oscillatory voltage appearing during the charging process. The load impedance is assumed to be dissipative.

In the above embodiment of the invention, a thyratron has been utilized as a switch. It is clear from the description that any switch with proper precision firing characteristics and adequate current carrying capacity may be used.

Figure 8:
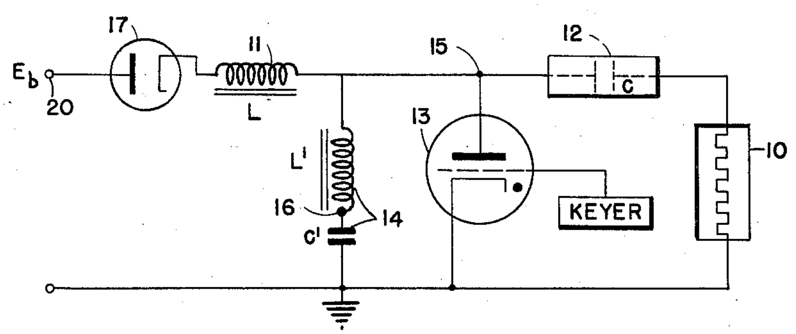
Figure 8 shows a circuit diagram of another embodiment of the present invention.
Figure 9:
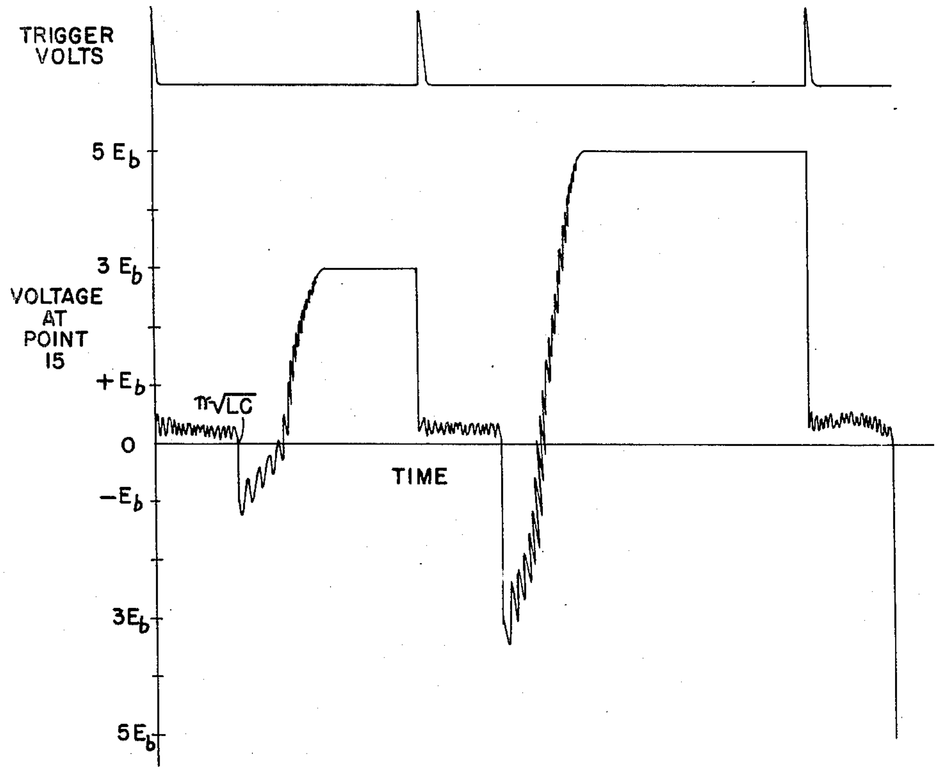
Figure 9 shows a waveform useful in analyzing the behavior of the circuit of Figure 8.

The name "resonant charging" may be applied as well to that process in which charging of an energy storage element takes place at intervals at least equal to the resonant period of the charging circuit. This may be accomplished by use of elements which pass currents in only one direction placed at the proper points in the circuit. Referring to Fig. 8, the unilateral element, a diode, 17 is placed so that the requirement in the triggering period is relaxed, i. e., the triggering period T now satisfies $T\geq 2\pi\sqrt{L(C+C')}$, and this is illustrated in Fig. 9.

It should be understood that no attempt has been made in the above description to make a complete account of possible embodiments or applications of the invention; many variants thereof will be apparent to those skilled in the art, and the scope of the invention should be limited only by the scope and spirit of the appended claims.

The invention described herein may be manufactured and used by or for the Government of the United States of America for governmental purposes without the payment of any royalties thereon or therefor.

What is claimed is:

1. In a system for producing high voltage pulses of short duration operating from a low voltage direct current source, an oscillatory circuit including inductance and capacitance in series, a pulse storage means and a load impedance connected in series across the oscillatory circuit, means having a high impedance to said pulses and a high inductance connecting the direct current source to the oscillatory circuit, normally open switch means connected across the oscillatory circuit, means controlling said switch means for closing said switch means in coincident time relation with the termination of a charging current from said source through said capacitance, said control means opening said switch means responsive to the termination of a discharging current from said capacitance, whereby said pulse storage means is charged from said source by said charging current and discharged into said load responsive to the closing of said switch.

2. In a system for producing high voltage pulses of short duration operating from a low voltage direct current source, an oscillatory circuit including inductance and capacitance in series, a pulse storage means and a load impedance connected in series across the oscillatory circuit, unilateral means in series with means having a high impedance to said pulses and a high inductance connecting the direct current source to the oscillatory circuit, and switching means connected across the oscillatory circuit successively operative at intervals of zero current flow in said circuit, means controlling said switching means for closing said switching means after the termination of a charging current from said source through said capacitance, said control means opening said switching means responsive to the termination of a discharging current from said capacitance, whereby said pulse storage means is charged from said source by said charging current and discharged into said load responsive to the closing of said switching means.

3. In a system for producing high voltage pulses of short duration operating from a low voltage direct current source, an oscillatory circuit including inductance and capacitance in series, a pulse storage means and a load impedance connected in series across the oscillatory circuit, means including an inductance connecting the direct current source to the oscillatory circuit, keyer means and gas tube switching means including a control element connected across the oscillatory circuit said control element periodically operative at the period thereof in synchronism with application of keying pulses from the keyer means, whereby the pulse storage means is discharged into the load impedance and recharged from the low voltage source.

4. In a system for producing high voltage pulses of short duration operating from a low voltage direct current source, an oscillatory circuit including inductance and capacitance in series, a pulse storage means and a load impedance connected in series across the oscillatory circuit, means including an inductance connecting the direct current source to the oscillatory circuit, gas tube switching means connected across the oscillatory circuit, means controlling said switching means for closing said switching means in coincident time relation with the termination of a charging current from said source through said capacitance, said control means opening said switching means responsive to the termination of a discharging current from said capacitance, whereby said pulse storage means is charged from said source by said charging current and discharged into said load responsive to the closing of said switching means.

5. In a system for producing high voltage pulses of short duration operating from a low voltage direct current source, an oscillatory circuit including inductance and capacitance in series, a pulse storage means and a load impedance connected in series across the oscillatory circuit, unilateral means and an inductance in series connecting the direct current source to the oscillatory circuit, gas tube switching means connected across the oscillatory circuit, means controlling said switching means for closing said switching means after the termination of charging current from said source through said capacitance, and for opening said switching means responsive to the termination of a discharging current from said capacitance, whereby said pulse storage means is charged from said source by said charging current and discharged into said load responsive to the closing of said switching means.

6. In a device for transforming low direct current voltage to high voltage pulses, a source of direct current voltage, a charging circuit comprising a potential storage means and a load impedance connected in series, means including a high impedance to said pulses and a high inductance connecting said source to said charging circuit, a discharging circuit for said charging circuit comprising a normally open switch means connected across said charging circuit, control means for said switch means, oscillatory means comprising a series resonant circuit in parallel with said discharging circuit, said oscillatory means operative upon actuation of said discharging circuit by said control means to increase the potential difference between said direct current charging source and said charging circuit.

7. In a system for producing high voltage pulses of short duration, a direct current low voltage source, a charging circuit comprising potential storage means and a load impedance connected in series, inductance means connecting said charging circuit to said source, a switch connected across said charging circuit, a series resonant circuit connected in parallel with said switch, and control means for said switch operative upon storage in said storage means of a potential from said source to close said switch and operative after substantially one-half the period of oscillation of said resonant circuit to open said switch.

8. In combination, a potential storage means and a load impedance connected in series, a source of low direct current voltage, means including a large inductance connecting said voltage source to said potential storage means, a switch connected across said series-connected potential storage means and load impedance, oscillatory means comprising a series resonant circuit, and means connecting said oscillatory means in parallel with said switch.

RAYMOND L. ALTY.

REFERENCES CITED

The following references are of record in the file of this patent:

UNITED STATES PATENTS

| Number | Name | Date |
|---|---|---|
| 2,084,004 | Riccioni | June 15, 1937 |
| 2,394,389 | Lord | Feb. 5, 1946 |
| 2,405,069 | Tonks | July 30, 1946 |